United States Patent
Lizell

(10) Patent No.: US 10,520,055 B2
(45) Date of Patent: Dec. 31, 2019

(54) RECOIL SUPPRESSING HYDRAULIC DAMPER FOR A TRAIN COUPLER

(71) Applicant: DELLNER DAMPERS AB, Flen (SE)

(72) Inventor: Magnus Lizell, Lidingö (SE)

(73) Assignee: Dellner Dampers AB, Flen (SE)

(*) Notice: Subject to any disclaimer, the term of this patent is extended or adjusted under 35 U.S.C. 154(b) by 0 days.

(21) Appl. No.: 16/066,363

(22) PCT Filed: Dec. 22, 2016

(86) PCT No.: PCT/EP2016/082359
§ 371 (c)(1),
(2) Date: Jun. 27, 2018

(87) PCT Pub. No.: WO2017/114747
PCT Pub. Date: Jul. 6, 2017

(65) Prior Publication Data
US 2019/0017565 A1 Jan. 17, 2019

(30) Foreign Application Priority Data

Dec. 29, 2015 (EP) .................................. 15202945

(51) Int. Cl.
*F16F 5/00* (2006.01)
*F16F 9/06* (2006.01)
(Continued)

(52) U.S. Cl.
CPC .............. *F16F 9/063* (2013.01); *F16F 9/3242* (2013.01); *F16F 9/58* (2013.01)

(58) Field of Classification Search
CPC ........ B60G 15/12; B60G 17/08; B60G 11/12; B61G 9/08
(Continued)

(56) References Cited

U.S. PATENT DOCUMENTS 2,661,207 A 12/1953 Allinquant
2,856,143 A * 10/1958 Westcott, Jr. ............ B64C 25/22
244/102 R
(Continued)

FOREIGN PATENT DOCUMENTS

CN 1351554 A 5/2002
DE 1 455 227 A 3/1969
(Continued)

OTHER PUBLICATIONS

Search Report and Written Opinion dated Mar. 13, 2017, issued in corresponding International Application No. PCT/EP2016/082359.
(Continued)

*Primary Examiner* — Christopher P Schwartz
(74) *Attorney, Agent, or Firm* — Morgan, Lewis & Bockius LLP

(57) ABSTRACT

A damper for a train coupler is shown, comprising a hydraulic balancing chamber (115) defined in an annular space between a piston (101) and a housing (102) in which the piston is movably received, wherein the balancing chamber is in flow communication with a hydraulic high-pressure chamber (103) via inlet and outlet bores (116; 130) formed through a slip-ring (117) that journals the piston in the housing. A portion (129) of the piston is shielded in a buffer chamber (128) formed in the annular space between the piston and the housing, in axial alignment with the balancing chamber.

16 Claims, 2 Drawing Sheets

Figure 1:
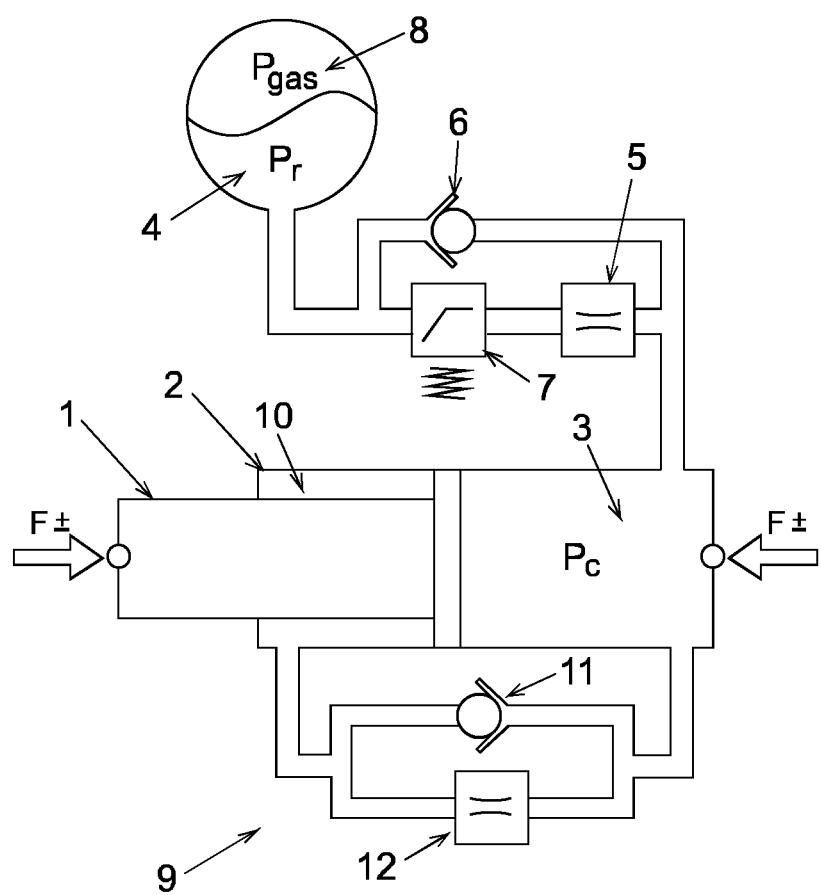

(51) Int. Cl.
*F16F 9/58* (2006.01)
*F16F 9/32* (2006.01)

(58) Field of Classification Search
USPC ...... 188/284–286, 314, 315, 322.15, 322.22; 213/20–23, 43–45, 220–223; 267/64.26, 267/116–119
See application file for complete search history.

(56) References Cited

U.S. PATENT DOCUMENTS

| | | | |
|---|---|---|---|
| 3,193,112 A | | 7/1965 | Karakashjan et al. |
| 3,411,635 A | * | 11/1968 | Powell ..................... B61G 9/08 213/8 |
| 3,554,387 A | * | 1/1971 | Thornhill ................ B61G 11/12 213/223 |
| 4,405,119 A | | 9/1983 | Masclet et al. |
| 4,973,854 A | | 11/1990 | Hummel |
| 5,160,123 A | * | 11/1992 | Danieli .................. B61G 11/12 188/284 |
| 5,860,497 A | * | 1/1999 | Takahashi ............... F16F 9/066 188/314 |
| 6,279,765 B1 | * | 8/2001 | Monaco ................... B61G 9/08 188/269 |
| 6,311,961 B1 | * | 11/2001 | Julia .................. B60G 17/0416 188/313 |
| 6,814,348 B1 | | 11/2004 | Leben et al. |
| 9,533,542 B2 | * | 1/2017 | Allen ..................... B60G 17/08 |

FOREIGN PATENT DOCUMENTS

| | | |
|---|---|---|
| EP | 1 352 802 A | 1/2007 |
| FR | 1 392 794 A | 3/1965 |
| GB | 2 011 018 A | 7/1979 |

OTHER PUBLICATIONS

First Notification of Office Action issued in corresponding Chinese Patent Application No. 201680077292.6, dated Aug. 22, 2019.

* cited by examiner

RECOIL SUPPRESSING HYDRAULIC DAMPER FOR A TRAIN COUPLER

TECHNICAL FIELD OF THE INVENTION

The present invention relates to hydraulic dampers of a type which is suitable for integration in train couplers. In particular, the invention relates to a damper capable of suppressing recoil and jerking by absorbing shock in both compression and extension of the damper.

BACKGROUND AND PRIOR ART

Hydraulic dampers, in the field also referred to as buffers, are commonly installed in central buffer couplings adapted for connection of rail vehicles. In the central buffer coupling a damper can be effective for absorbing shock loads in both compression and extension of the damper, in this way reducing jerking and smoothening the ride for passengers.

The general function and structure of the subject hydraulic dampers include a hollow piston which is received axially movable in a cylindrical housing. A volume of hydraulic fluid is contained in a working chamber in the housing. The working chamber communicates with an overflow chamber in the piston via a restriction. In compression of the damper, such as in the case of a buff load higher than moderate which pushes the piston further into the housing, hydraulic fluid is forced via the restriction into the overflow chamber as the volume of the working chamber is reduced. A partitioning element which slides freely in the hollow piston is displaced by the inrushing fluid, this way increasing the volume of the overflow chamber. The partition wall is displaced against the force of a compressible spring which is loaded while absorbing most or all of the energy that caused compression of the damper. This spring is usually a gas volume which under moderate load absorbs the energy generated in compression of the damper. In extension of the damper the spring releases its accommodated energy to return hydraulic fluid in the overflow chamber back to the working chamber. The reverse flow is typically routed other way bypassing the restriction, this way permitting a non-restricted return of the piston to its unloaded position. With the purpose of avoiding a heavy recoil as the piston is returned in extension motion, an additional chamber can be arranged to receive a smaller volume of hydraulic fluid during compression while returning the same volume via a restricted passage during extension of the damper, this way balancing the expansion of the gas spring and of the damper.

Dampers of the type are previously known in the literature. In EP1352802B1 there is disclosed a damper for a central buffer coupling arrangement wherein a balancing chamber is located in an annular space defined between a cylinder and a piston received movable in the cylinder. An asymmetric throttle means for fluid flow into the balancing chamber is located in the flow path which connects a working chamber in the cylinder with an overflow chamber in the piston, the asymmetric throttle means in other words being arranged in-line with the restriction that controls the flow from the working chamber to the overflow chamber. The asymmetric throttle means includes radially formed inlet and outlet bores, a non-return valve in the inlet bore and a reduced diameter of the outlet bore.

In DE1455227A1 there is disclosed a gas-hydraulic damper arrangement wherein a balancing chamber is arranged in an annular space that is formed between a piston and a cylinder in which the piston is accommodated. The balancing chamber communicates with a working chamber via an axial bore through an over-sized end-plate covering the end of the piston. A throttling effect to the return flow from the balancing chamber to the working chamber is achieved by means of a free-floating ring in the balancing chamber, the ring during a return stroke being moved towards the end plate by the pressure differential between the balancing chamber and the working chamber. An outlet bore in the ring is positioned in mating relation with the inlet bore of same diameter through the end-plate of the piston, thus extending the flow path for the hydraulic fluid in the return-flow.

U.S. Pat. No. 4,973,854A discloses a vibration damper comprising two working chambers, one of which is arranged in the cylinder and the other of which is located in an annular space defined between the cylinder and a piston movable in the cylinder. The annular chamber communicates with the working chamber in the cylinder via inlet/outlet bores through a radial flange formed in the inner end of the piston. The vibration damper is shown with one-way valves installed in the bores. Throttle means in the bores are mentioned in the document, but are not particularly described or shown in the drawings.

SUMMARY OF THE INVENTION

An object of the present invention is to provide a damper for a train coupler of alternative design and enhanced recoil suppressing characteristics.

Another object of the present invention is to provide a damper with improved protection of the hydraulic circuit in the damper from the environment outside the damper.

One or more of these objects are met in a damper arranged for shock absorption in both compression and expansion, the damper comprising:
  a cylindrical housing wherein a hollow piston is received axially movable,
  a hydraulic working chamber of variable volume in the housing,
  a hydraulic overflow chamber of variable volume in the piston,
  a spring means confined in a chamber of variable volume in the piston,
  a throttling means in a flow passage between the working chamber and the overflow chamber in the form of a flow restriction that varies with the position of the piston relative to the housing,
  a hydraulic balancing chamber of variable volume formed in an annular space between the piston and the housing,
wherein the damper further comprises:
  a slip-ring carried on a piston head in an inner end of the piston, the slip-ring journaling the piston in the housing and separating the balancing chamber from the working chamber;
  at least one inlet bore through the slip-ring permitting direct flow from the working chamber to the balancing chamber in compression of the damper; and
  at least one outlet bore providing restricted flow through the slip-ring from the balancing chamber to the working chamber in expansion of the damper.

By introducing the slip-ring as a separate element for journaling the piston in the housing and which is also active in the bi-directional communication between the balancing chamber and the working chamber, there is achieved the advantage of choice of material in the slip-ring and high precision in manufacture, resulting in better control of dimensions for enhanced sealing and bearing properties, as well as reduced wear of bearing surfaces in the damper.

Sealing against the housing is accomplished by a slide-bearing element accommodated in the outer periphery of the slip-ring and journaling the forward end of the piston which can move reciprocally in the housing. In a preferred embodiment the slip-ring is formed on its outer periphery with a seat for accommodation of the slide-bearing element that also provides sealing between the working chamber and the balancing chamber.

The slip-ring formed as a separate and replaceable element further provides the advantage of great versatility in the layout and realization of the inlet and outlet bores.

In one embodiment the slip-ring is associated with a valve disc in the balancing chamber arranged to seat against that side of the slip-ring which faces the balancing chamber. In this embodiment the outlet bores can be realized as openings of reduced diameter through the valve disc mating with the inlet bores in the slip-ring.

A cup spring may be arranged to bias the valve disc towards the slip-ring and to apply this way an early restriction to return flow via the outlet bores even before a recoil or jerk arises.

In one embodiment the valve disc is biased towards the slip-ring by a cup spring that is affixed to the piston by means of a locking ring which is recessed into a circumferential groove on the exterior of the piston.

The advantage of this design lies in its simplicity and the minimum of machining required for installation of the cup spring and valve disc on the piston.

In one embodiment the piston carries in its inner end a piston head coupled to the piston, wherein in coupled position the piston head holds the slip-ring in clamped fixation to the piston.

The piston head contains the passages that provide fluid communication between the working chamber and the overflow chamber, including the components of a throttling means, non-return valve and one or more return-flow passages. An external thread on the piston may be arranged to provide engagement with an inner thread on the piston. Clamping the slip-ring between the end of the piston and the piston head as suggested provides the advantage of an installation of the slip-ring which is made possible without requiring structural modification of the piston or of the piston head.

In accordance with the present invention the balancing chamber is delimited axially by the slip-ring in one end of the balancing chamber and by a sealing ring in the other end of the balancing chamber. The sealing ring accommodates sealing elements sealing against the piston and against the housing. The sealing ring is arrested relative to the housing, but is sliding relative to the piston.

The sealing ring with sealing elements provide a technical effect in its capacity of forming a first and inner environmental barrier, which on one hand prevents leakage of hydraulic fluid via the balancing chamber and which on the other hand prevents intrusion of external foreign matter that could otherwise contaminate the hydraulic fluid.

The sealing ring is axially arrested relative to the housing by being clamped between a radial step, formed on the inner periphery of the housing, and an inner end of a cylinder lining the inner periphery of the housing.

The embodiment provides the advantage of simple structure and installation in the damper housing.

One embodiment of the invention foresees that the hydraulic circuit in the damper, comprising the balancing chamber, the working chamber and the overflow chamber, are environmentally protected inside of a second and outer barrier which is formed by a slide-bearing element that provides sealing and journaling of the piston in the end of the housing. This slide-bearing element is accommodated in a seat associated with a coupling ring which is affixed to the end of the housing, and provides sealing against a portion of the piston that projects from that end of the housing.

In other words, a length of the piston which in compression passes the sealing ring and is pushed into the balancing chamber, is accommodated in a buffer chamber which is axially aligned with the balancing chamber in the annular space that is formed between the housing and the piston. The buffer chamber has sufficient length for shielding said length of the piston also in a maximum extended state of the damper. In other words, the length of the buffer chamber is at least equal to the maximum stroke length of the piston. These measures contribute to give the damper a long service life by guaranteeing an accurate and effective seal between the sealing ring and the piston, the subject length of the piston being shielded from any sort of external damage and wear.

SHORT DESCRIPTION OF THE DRAWINGS

Figure 2:
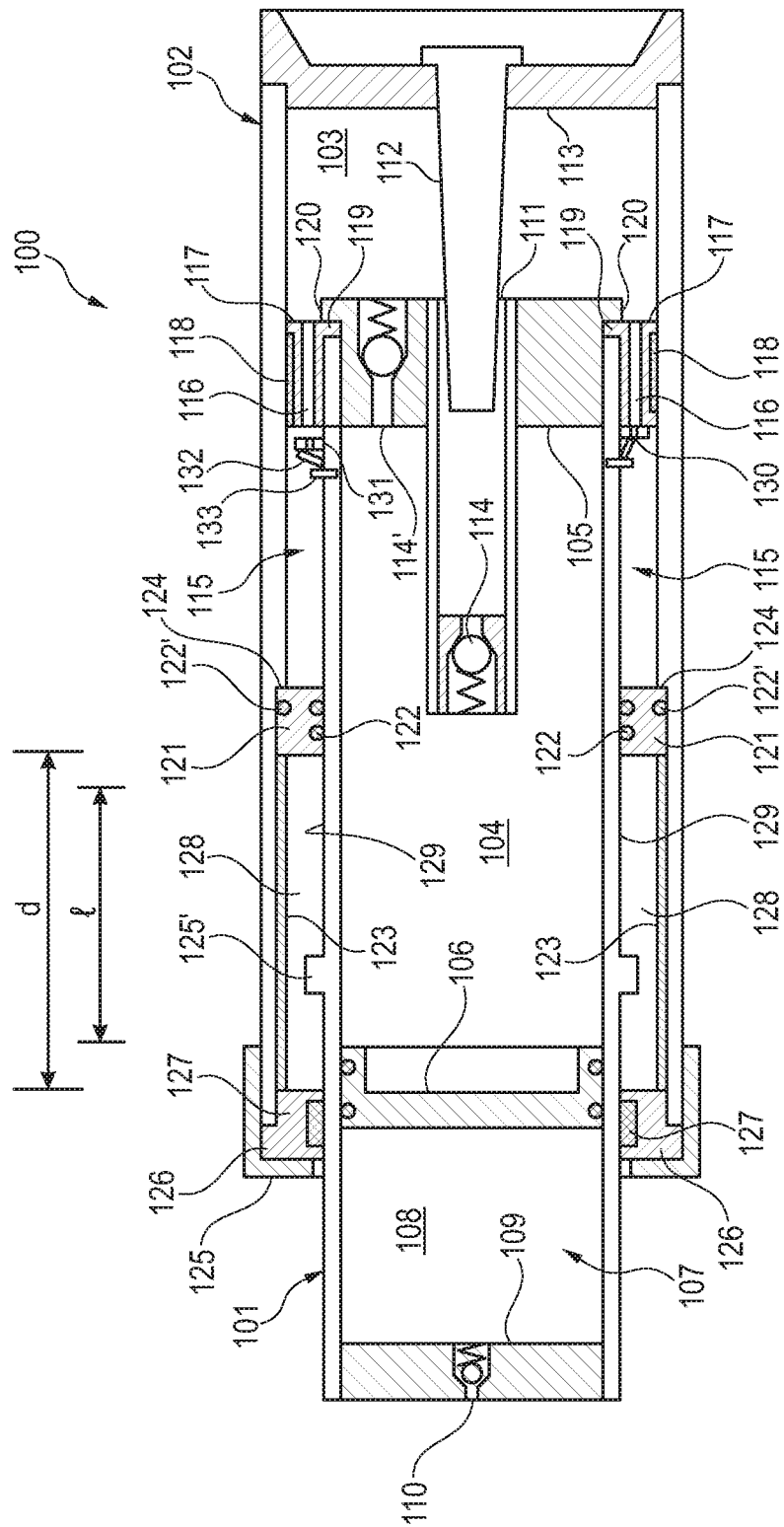

The damper will be further explained below with reference made to the accompanying schematic drawings, wherein FIG. 1 is a diagram showing the principle of operation of a recoil suppressing damper, and FIG. 2 is a section through the longitudinal centre of one embodiment of the damper of the present invention.

DETAILED DESCRIPTION OF PREFERRED EMBODIMENTS

With reference to FIG. 1 the main structural components of a recoil suppressing hydraulic damper include a piston 1 received to move axially in compression and extension directions in a cylinder housing 2. A working chamber 3 in the housing 2, containing a volume of hydraulic fluid, is in fluid flow communication with an external overflow chamber 4 via a flow restriction 5 and a non-return valve 6. The flow restriction 5 forms a throttling means which can comprise a variable orifice area for hydraulic metering. In practise the degree of restriction to the flow of hydraulic fluid provided by the flow restriction 5 may be dependent on the current position of the piston in the housing. A pressure controlled blow-off valve 7 is arranged in succession with the flow restriction 5 and set to open in response to an increased predetermined pressure being generated in the hydraulic fluid volume in the working chamber, as the result of the piston and housing being compressed by external force. A gas volume 8 in the overflow chamber 4 is then compressed and loaded as hydraulic fluid is shifted from the working chamber to the overflow chamber. When the load on the piston ceases the gas 8 expands to shift the fluid in the overflow chamber back to the working chamber via the non-return valve 6, in a recoil following upon a compressive shock load.

In order to slow down the return motion of the piston in expansion, a hydraulic fluid circuit 9 is arranged as a balance to the gas volume in the overflow chamber. The hydraulic circuit 9 comprises a balancing chamber 10 which is in fluid flow communication with the working chamber 3 via a non-return valve 11 and a flow restriction 12. In compression, as the piston is pushed into the housing, hydraulic fluid is shifted from the working chamber into the balancing chamber 10 via the non-return valve substantially without restriction, whereas in expansion the fluid is returned via the flow restriction 12 at a substantially reduced flow, this way suppressing recoil and vibration.

With reference to FIG. 2 a damper 100 of the present invention comprises a hollow piston 101 which is received axially movable in reciprocating directions in a cylindrical housing 102. In the housing 102 there is formed a working chamber 103 containing hydraulic fluid/oil defined between the housing and an inner end of the piston. The working chamber 103 is in fluid flow communication with an overflow chamber 104 of variable volume arranged inside the hollow piston 101. The overflow chamber is defined between a piston head 105, coupled to the inner end of the piston 101, and a partitioning wall 106 which is sliding freely inside the hollow piston. The partitioning wall 106 separates the hydraulic fluid in the overflow chamber from a compressible spring 107. The spring 107 is confined in a chamber 108 of variable volume, defined between the partition wall 106 and an end-piece 109 that is connected to an outer end of the piston which projects from the housing. The spring 107 in chamber 108 is typically a volume of gas which is introduced via a one-way valve 110 arranged in the end-piece 109.

The flow of hydraulic fluid from the working chamber 103 to the overflow chamber 104 during compression of the damper passes a throttling means. The throttling means comprises a fixed diameter orifice 111 arranged in the piston head 105 and a metering pin 112 reaching through the orifice 111 from its anchoring point in an end-piece 113 which is coupled to the end of the damper housing 102. In this context it serves to point out that the invention is not limited to throttling arrangements including a conical metering pin as illustrated, other alternatives are available such as straight and perforated metering pins e.g. It may be preferred though to arrange a flow restriction that varies with the position of the piston relative to the cylinder housing.

The flow from the working chamber 103 to the overflow chamber 104 is this way routed exclusively via the flow restriction 111-112 of the throttling means 111-112. A non-return valve 114 can be arranged in the flow path from the working chamber to the overflow chamber to prevent return flow via the throttling means 111-112. The valve 114 is acted upon by a spring which holds the valve in closing position until a predetermined opening pressure is generated in the hydraulic fluid in the working chamber. Reverse flow from the overflow chamber to the working chamber is routed other way through the piston head 105, such as via one or more one-way passages 114'.

In the damper 100, a radial spacing between the piston and the housing defines a balancing chamber 115. The balancing chamber 115 is in direct flow communication with the working chamber 103 via a number of inlet bores 116. The inlet bores 116 are formed through a slip-ring 117 which is supported in the inner end of the piston 101. The inlet bores 116 are dimensioned to provide a substantially unrestricted flow of hydraulic fluid from the working chamber into the balancing chamber during compression of the damper.

The slip-ring 117 is a precision-machined element having an outer diameter that mates with the inner diameter of the cylinder housing. A circumferential seat in the outer periphery of the slip-ring accommodates a ring-shaped, low-friction slide-bearing element 118 which provides sealing against the inner periphery of the housing and journals the fore end of the piston in the housing. A radially inwards depending flange 119 in a forward end of the slip-ring is clamped between the forward end of the piston and a radial shoulder 120 formed on the piston head 105. The piston head 105 is in turn coupled to the piston through a threaded engagement between an inner thread on the piston and a threaded portion in the exterior of the generally cylindrical piston head 105.

The slip-ring 117 separates the balancing chamber 15 from the working chamber 103, thus delimiting the axial extension of the balancing chamber 115 in a forward direction. In the opposite direction the balancing chamber is delimited by a sealing assembly comprising a sealing ring 121. The sealing ring 121 is axially arrested in the damper as will be explained below, whereas the slip-ring 117 moves with the piston, thus changing the length and volume of the balancing chamber in relation to the piston's position in the housing.

The sealing ring 121 has an inner periphery mating with the outer diameter of the piston. Seats are formed in the inner and outer peripheries of the sealing ring 121 for accommodation of sealing elements 122 and 122' sealing against the outer surface of the piston and against the inner surface of the housing respectively. The sealing ring 121 with sealing elements 122, 122' provide an inner barrier that environmentally isolates and protects the balancing chamber and the hydraulic circuit in the damper including the fluid filled working, overflow and balancing chambers.

The sealing ring 121 has an outer periphery and diameter mating with a turned down length of increased diameter formed in the inner periphery of the housing. A cylinder 123, lining the turned down length of the housing, arrests the sealing ring 121 against a shoulder 124 which forms a radial step between the lengths of different diameters in the inner periphery of the damper housing 102.

The lining cylinder 123 is arrested in the housing by means of a coupling ring 125 which is affixed to the housing 102. A thrust collar 125' is positioned on the piston to transmit to the housing 102, via the coupling ring 125, the force that is applied to the damper in draft. Accordingly, in FIG. 2 the damper 100 is shown in a partially compressed state.

The coupling ring 125 provides a seat 126 for a slide bearing element 127. Bearing elements 118 and 127 cooperate to provide a stable journal of the piston 101 in the housing 102.

The assembly of elements 125-127 in addition provides a second and outer barrier that isolates the inner parts of the damper from the outer environment. More precisely, the outer and inner barriers 125-127 and 121-122/122' define between them a chamber 128 in which a length 129 of the piston 101 is accommodated and shielded from any sort of external damage and wear. The chamber 128 forms a buffer between the balancing chamber 115 and the external environment. These measures contribute to give the damper a long service life by guaranteeing an accurate and effective seal between the sealing ring 121 and the piston. More precisely, the axial distance d between the inner seal assembly 121-122/122' and the outer seal assembly 125-127, i.e. the length d of the buffer chamber 128, is at least equal to the maximum stroke length 1 of the piston 101. It is thus ensured that no portion of the piston which is exposed to hydraulic fluid in the balancing chamber in compression of the damper passes the outer seal assembly 125-127 in extension of the damper.

The return of hydraulic fluid from the balancing chamber 115 to the working chamber 103 is routed via one or more outlet bores 130 (see reference number 130 in the lower side of the damper in FIG. 1). The outlet bores, having a reduced diameter relative to the diameter of the inlet bores 116, are dimensioned to apply a restriction to the flow as compared to the substantially unrestricted flow via the inlet bores 116. In extension of the damper 100 the outlet bores 130 thus provide restrictions to the flow through the slip-ring.

In the illustrated embodiment the outlet bores are realized in the form of holes 130 made through a valve disc 131 (see reference number 131 in the upper side of the damper) which is seated against the slip-ring 117 in the balancing chamber in a "closing" state of the valve disc. The valve disc 131 is ring-shaped and biased by a ring-shaped cup spring 132 to rest against the slip-ring 117 while mating the outlet bores 130 with the inlet bores 116 on the side of the slip-ring that faces the valve disc. A locking ring 133, which is recessed into a circumferential groove in the exterior of the piston, holds the cup spring 132 axially on the piston and in biasing contact with the valve disc 131.

The cup spring 132 is sized to hold the valve disc 131 in the closing position until the pressure in the working chamber 103 overcomes the force of the cup spring. Upon reach of the predetermined pressure the valve disc 131 is separated from the slip-ring 117 as hydraulic fluid at high pressure is forced through the inlet bores 116 during compression of the damper, see the valve disc 131 in "opened" position in the upper side of the damper. As the compressive force acting on the damper ceases, and even before the pressures in the communicating chambers 103, 104 are equalized, the cup spring forces the valve disc to seat against the slip-ring and to apply this way an early restriction to return flow via the outlet bores 130, as illustrated in the lower side of the damper of FIG. 1.

In other words, jerking resulting from recoil in the damper as the piston motion is reversed is not only counteracted, but rather prevented by the early activation of a restriction to the return flow from the balancing chamber to the working chamber.

The invention claimed is:

1. A damper for a train coupler arranged for shock absorption in both compression and expansion, the damper comprising:
   a cylindrical housing wherein a hollow piston is received axially movable,
   a hydraulic working chamber of variable volume in the housing
   a hydraulic overflow chamber of variable volume in the piston,
   a spring means confined in a chamber of variable volume in the piston,
   a throttling means in a flow passage between the working chamber and the overflow chamber in the form of a flow restriction) that varies with the position of the piston relative to the housing,
   a hydraulic balancing chamber of variable volume formed in an annular space between the piston and the housing,
   a slip-ring carried on a piston head in an inner end of the piston, the slip-ring journaling the piston in the housing and separating the balancing chamber from the working chamber,
   at least one inlet bore through the slip-ring permitting direct flow from the working chamber to the balancing chamber in compression of the damper,
   at least one outlet bore providing restricted flow through the slip-ring from the balancing chamber to the working chamber in expansion of the damper, and
   a buffer chamber formed in the annular space between the piston and the housing in axial alignment with the balancing chamber, separated from the balancing chamber through a sealing ring, wherein in the buffer chamber a thrust collar is positioned on the piston to transmit to the housing the force that is applied to the damper in draft.

2. The damper of claim 1, wherein the balancing chamber is delimited axially by means of the sealing ring which is arrested in the housing and arranged sliding on the exterior of the piston, the sealing ring sealing against the housing and the piston.

3. The damper of claim 2, wherein the sealing ring is clamped between a radial shoulder formed in the inner periphery of the housing and an inner end of a cylinder lining the inner periphery of the housing.

4. The damper of claim 3, wherein the lining cylinder is arrested in the housing by means of a coupling ring which is affixed to the housing.

5. The damper of claim 4, wherein the buffer chamber is delimited axially by the sealing ring and a slide-bearing element sealing and journaling the piston in the end of the housing, the sealing ring and slide-bearing element providing an inner and an outer barrier which isolate the balancing chamber from the environment outside the damper.

6. The damper of claim 5, wherein the length (d) of the buffer chamber is at least equal to the maximum stroke length (l) of the piston.

7. The damper of claim 3, wherein the buffer chamber is delimited axially by the sealing ring and a slide-bearing element sealing and journaling the piston in the end of the housing, the sealing ring and slide-bearing element providing an inner and an outer barrier which isolate the balancing chamber from the environment outside the damper.

8. The damper of claim 7, wherein the length (d) of the buffer chamber is at least equal to the maximum stroke length (l) of the piston.

9. The damper of claim 2, wherein the buffer chamber is delimited axially by the sealing ring and a slide-bearing element sealing and journaling the piston in the end of the housing, the sealing ring and slide-bearing element providing an inner and an outer barrier which isolate the balancing chamber from the environment outside the damper.

10. The damper of claim 9, wherein the length (d) of the buffer chamber is at least equal to the maximum stroke length (l) of the piston.

11. The damper of claim 1, wherein the slip-ring is associated with a valve disc in the balancing chamber, the valve disc biased towards the slip-ring by means of a spring.

12. The damper of claim 11, wherein the outlet bore(s) are holes) through the valve disc mating with the inlet bores in the slip-ring.

13. The damper of claim 12, wherein the valve disc is biased towards the slip-ring by a cup spring which is affixed to the piston by means of a locking ring that is recessed into a circumferential groove on the exterior of the piston.

14. The damper of claim 11, wherein the valve disc) is biased towards the slip-ring by a cup spring which is affixed to the piston by means of a locking ring that is recessed into a circumferential groove on the exterior of the piston.

15. The damper of claim 1, wherein the slip-ring is formed on its outer periphery with a seat for accommodation of a slide-bearing element that journals the piston in the housing and provides sealing between the working chamber and the balancing chamber.

16. The damper of claim 1, wherein the length (d) of the buffer chamber is at least equal to the maximum stroke length (l) of the piston.

* * * * *